United States Patent [19]

Merkle

[11] Patent Number: 4,714,287

[45] Date of Patent: Dec. 22, 1987

[54] BENDING BAR TO BE USED AS A BUMPER OF A VEHICLE

[75] Inventor: Josef Merkle, Esslingen, Fed. Rep. of Germany

[73] Assignee: Daimler-Benz Aktiengesellschaft, Stuttgart, Fed. Rep. of Germany

[21] Appl. No.: 842,256

[22] Filed: Mar. 21, 1986

[30] Foreign Application Priority Data

Mar. 23, 1985 [DE] Fed. Rep. of Germany ....... 3510590

[51] Int. Cl.4 ............................................. B60R 19/04
[52] U.S. Cl. .................................. 293/102; 293/122; 293/155
[58] Field of Search ............... 293/102, 120, 121, 122, 293/132, 117, 142, 143, 144, 154, 155; 29/155 R, 446; 228/173.6

[56] References Cited

U.S. PATENT DOCUMENTS

| | | | |
|---|---|---|---|
| 1,325,738 | 12/1919 | Lyon | 293/155 X |
| 1,553,562 | 9/1925 | Short | 293/154 X |
| 1,759,201 | 5/1930 | Monteith | 293/154 X |
| 1,793,947 | 2/1931 | McMahon | 293/154 |
| 1,953,050 | 3/1934 | Jandus | 293/154 |
| 2,040,176 | 5/1936 | Jandus | 293/154 |
| 2,061,801 | 11/1936 | Kawasaki | 293/117 |
| 3,820,835 | 6/1974 | Wilfert | 293/120 |
| 3,876,243 | 4/1975 | Bell et al. | 293/122 X |
| 3,890,696 | 6/1975 | Buske | 228/173.6 |
| 3,901,543 | 8/1975 | Norlin | 293/122 |
| 4,076,296 | 2/1978 | Ditto et al. | 293/122 |
| 4,422,680 | 12/1983 | Goupy | 293/126 X |
| 4,440,429 | 4/1984 | Eyb | 293/122 X |
| 4,470,717 | 9/1984 | Brunke et al. | 228/173.6 X |

FOREIGN PATENT DOCUMENTS

| | | | |
|---|---|---|---|
| 2327702 | 12/1973 | Fed. Rep. of Germany | 293/120 |
| 2408762 | 8/1975 | Fed. Rep. of Germany | 293/122 |
| 0030642 | 2/1982 | Japan | 293/120 |
| 2033535 | 5/1980 | United Kingdom | 293/120 |

Primary Examiner—Randolph A. Reese
Assistant Examiner—Russell D. Stormer
Attorney, Agent, or Firm—Barnes & Thornburg

[57] ABSTRACT

A ending bar is designed as a bumper and composed of a front and a rear shell, the rear shell of which is under tensile prestress by means of an appropriate connection to the front shell.

27 Claims, 6 Drawing Figures

BENDING BAR TO BE USED AS A BUMPER OF A VEHICLE

The invention relates to a bending bar, especially a bending bar which can be used as a bumper of a vehicle and has a middle part located between two side parts, projecting on opposite sides, the two supports, and which, in closed cross-section, comprises a front and a rear half-shell.

Bending bars of closed cross-section have many uses. Conventionally, especially for use as bumpers on commercial vehicles or the like, they are produced from relatively thick-walled materials and fairly low-grade steels.

To achieve the general aim, in the sector of passenger cars and commercial vehicles, of reducing the weight of the vehicle as much as possible, without impairing its stability, use of steels of higher quality and bending bars with correspondingly thinner walls is appropriate. However, relatively narrow strength and weight limits are set in such circumstances because of the danger that thin-walled bending bars will buckle.

Taking this as a starting point, an object of the invention is to provide a construction for a bending bar which can be used, for example, as a bumper of a vehicle and which consists of high-strength thin-walled material, and which also meets requirements for a bumper.

According to the invention, in a bending bar of the type referred to above, the bending bar is instructed as a girder composed of a front and a rear half-shell, and of its half-shells the front half-shell having a greater moment of resistance, in relation to loads exerted transversely relative to back or web parts, than the rear half-shell which is connected to the front half-shell in its back or web part so as to generate a tensile prestress.

With such a design of the bending bar, it is possible without additional cost, to prestress the bending bar in the direction of pull on its side at the rear relative to the direction of the bending load, in such a way that the danger of buckling under a bending load, in this region subjected to pressure when the bending load is exerted, is reduced to a desired extent, and in particular is reduced until the possible bending load values of the bending bar relative to its particular cross-section can be fully utilized. This is especially important for the freely projecting side parts of bumpers designed as bending bars.

In an embodiment of the invention, the half-shells can be connected to one another by butt-jointing their legs or by overlapping their legs. The latter design allows greater tolerances in production and is also suitable for various types of connection, such as welding and bonding or the like, while essentially welding can be considered as appropriate when the legs are butt-joined to one another.

In an embodiment of the invention, it proves expedient if, in the initial position before connection, at least one of the half-shells has at least over some of its length, especially in the region of its side parts, a contour which bulges out in comparison with its configuration in the connects state.

According to the invention, the actual appearance of such a design can be, for example, that in a plan view, the front half-shell has a contour bulging convexly towards the rear half-shell, so that the rear half-shell, starting from an extended initial position, has to be stretched over this curve for connection, as a result of which the web region of the rear halfshell is subjected to tensile stress.

In a further embodiment, the front and rear shells, for example of symmetrical design, are each provided, in the initial position, with a curved contour on their sides facing one another, with specific preference symmetrically relative to the longitudinal center plane of the vehicle, so that, for connection, the two half-shells have to be pulled towards one another in the region of their ends and a central approximately straight joining-seam line is obtained.

To stiffen the bending bar, it also proves expedient to cover the open ends of the bending bar by means of closing caps spanning the half-shells, especially from back to back.

Furthermore, it is advantageous to provide a filling, for example a foam filling 60, for the bending bar, to increase its stability.

A bending bar according to the invention, which can be subjected to high loads, but which is nevertheless thin-walled, when supported at points, for example, relative to the longitudinal members lying symmetrically in relation to the longitudinal center axis of the vehicle, is at particular risk in the region of these supports and, particularly where the side parts are concerned, naturally loses a large part of its stability when it is dented in the region of the supports.

To prevent this, according to the invention there is preferably, in the region of these supports, a box-shaped insert, via which bracing relative to the longitudinal members can also be achieved at the same time. Appropriately, the box-shaped support has a mushroom-shaped contour in cross-section, to prevent hard edge contact between the support and the shell of the bending bar.

The foregoing objects, features and advantages of the present invention will become more apparent from the following description when taken in connection with the accompanying drawing, which shows, for the purposes of illustration only, plural embodiments in accordance with the present invention, and wherein.

Figure 1:
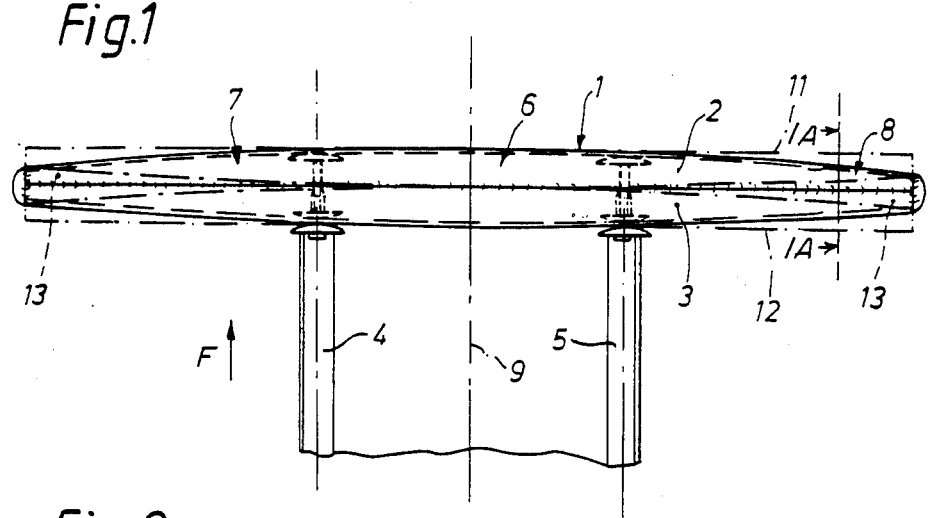
FIG. 1 shows, in a diagrammatic representation, a plan view of a bending bar used as a bumper of a commercial vehicle, with its support relative to the longitudinal frame members of the vehicle not shown in any more detail.
Figure 3:
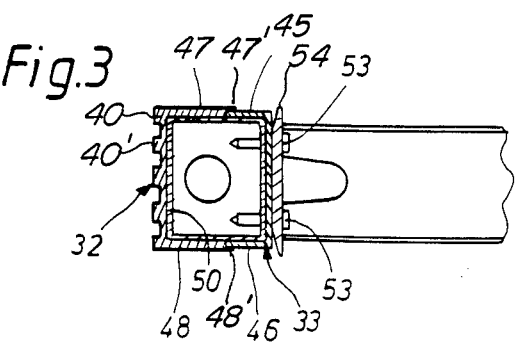
FIG. 3 shows a section along the line III—III of FIG. 2, again in a diagrammatic representation.

Referring now to the drawings wherein like reference numerals are used to designate like parts and more particularly to FIG. 1 in the figure denotes the bending bar which is designed as a bumper and which consists of a half-shell 2 at the front in relation to the driving direction F and a rear half-shell 3. As the section according to FIG. 3 shows, the half-shells have an approximately U-shaped cross-section.

The bumper is supported, in the longitudinal direction of the vehicle, via two longitudinal frame members 4 and 5, and relative to these longitudinal frame members 4 and 5 the bumper 1 has a middle part 6 located between the longitudinal frame members 4 and 5 and side parts 7 and 8.

Conventionally, as also shown in FIG. 1, the longitudinal frame members 4 and 5 are symmetrical relative to the longitudinal center plane 9 of the vehicle, and in a corresponding way the bumper 1 is also conventionally symmetrical relative to this plane 9.

In the exemplary embodiment illustrated, the bumper 1 tapers towards its ends located opposite one another, specifically in the region of its side parts 7 and 8 in particular, while the middle part 6 has essentially the same cross-section over its entire length.

Figure 1A:
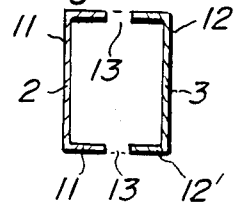
FIG. 1A shows a section taken along the line IA—IA in FIG. 1 prior to bonding of the front and rear half-shells.
Figure 3A:
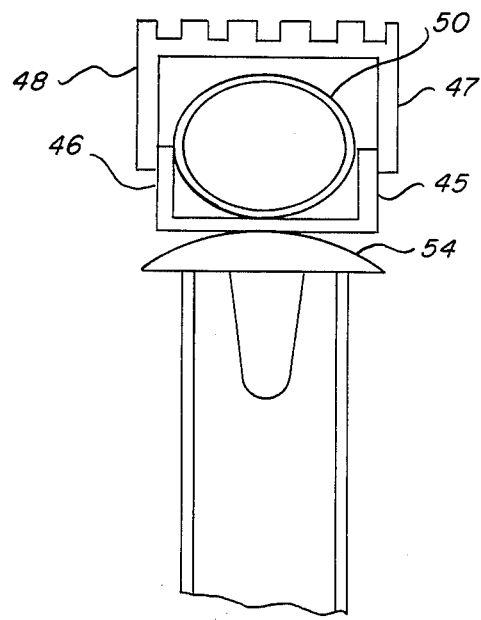
FIG. 3A shows a section along the line III—III of FIG. 2 in diagrammatic representation with a round insertion.

With reference to the illustration according to FIG. 1, as represented by dot-and-dash lines, the half-shells 2 and 3 have, in the initial position before connection formed here by a weld or other bond, back or web parts 11 and 12 extending in a straight line as the length of their legs 11' and 12', FIG. 1A, decreases towards the free ends of the side parts 7, 8. In a plan view, the two half-shells 2, 3 in their initial position before welding, are consequently located opposite one another in such a way that, with reference to contact between the end faces of the legs of the half-shells 2, 3 located opposite one another in the region of the longitudinal center plane 9 of the vehicle, a gap 13, for example, as shown in FIG. 1A, widening progressively towards the ends of the side parts 7, 8, occurs on both sides between the half-shells 2, 3.

When the two half-shells 2, 3, are clamped against one another for welding, in such a way that the gap 13 is closed, corresponding stresses are generated in the half-shells 2, 3. In the exemplary embodiment according to FIG. 1, three are tensile stresses occurring after welding, especially in the region of the back or web parts 11 and 12, both on the front half-shell 2 and on the rear half-shell 3.

As a result of this prestressing caused by deformation, the bending bar configured as a bumper is stabilized. In particular, this prestressing, which this particular construction aims to achieve, also makes it possible to exert on the bumper prestresses which have a favorable effect on its stability under load. Particularly, when thin-walled bumpers are concerned, this proves expedient when appropriately high-grade materials are used to reduce the weight. In such thin-walled bumpers, the danger of buckling under pressure loads sets a critical load limit.

According to the invention, this danger of buckling, which is especially critical for the rear half-shell 3 in the region of the side parts in respect of a load counter to the driving direction F and arising particularly in the end region of the side parts, is overcome by pressing the half-shells 2, 3 together to close the gap 13 for welding and thus generating a tensile stress which is exerted counter to the pressure load mentioned and by which a compressive stress of corresponding magnitude is compensated.

Figure 2:
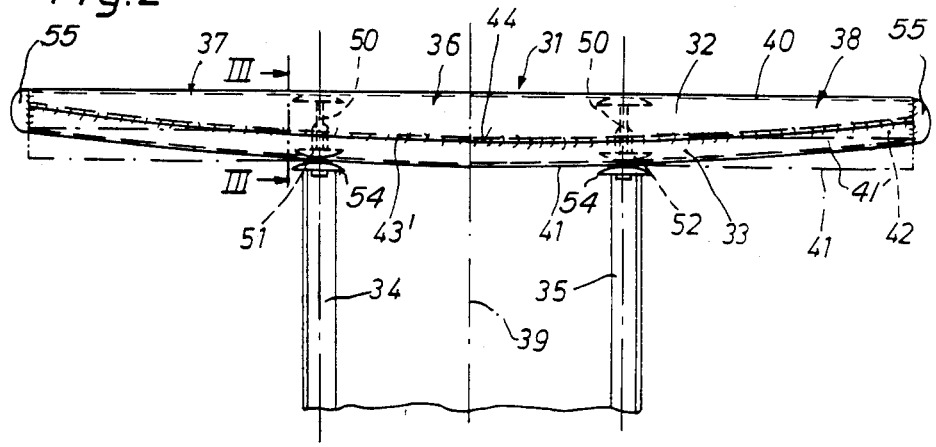
FIG. 2 shows a further design of a bending bar which can be used as a bumper, in a representation corresponding to that of FIG. 1.

The embodiment in FIG. 2 of the bumper 31 also serves essentially the same purpose the front half-shell being designated by 32 and the rear half-shell by 33 here.

As regards the support of the bumper 31 relative to the longitudinal frame members 34 and 35, in this embodiment, similar to the embodiment of FIG. 1, the bumper has a middle part 36 and side parts 37 and 38. The longitudinal center plane of the vehicle is designated by 39. The half-shells 32 and 33 have an essentially U-shaped cross-section and are each provided with a back or web parts, respectively, 40, 41 located between the legs of the half-shells 32, 33 of which those corresponding to one another run towards one another and are to be connected by means of a welding seam 43'.

As shown in FIG. 2, the forward surface of front half-shell 32 is substantially straight in a direction transverse to plane 30.

The bumper 31 is designed so that the front half-shell 32 has, as regards the free edge of its legs, a curved contour 44 corresponding to the line of the welding seam 43'. The front half-shell 32 has a curved contour 44 corresponding to that of the back or web part 40, part 40 extending in a straight line prior to binding to front rear half-shell 33. The curvature of the curved contour 44 is convex counter to the driving direction F. As shown in FIG. 2, the rear half-shell 33 may be of uniform width between caps 55, as indicated by parallel lines 41 and 41'.

Before welding, there is a gap 42 which is present when the rear half-shell 33 extends in a straight line a the same time as the back or web part 41 also extends in a straight line in the initial position prior to bonding 32. When the rear half-shell 33 is bent according to the curved contour 44 for welding, this gap is closed and it is possible to weld the two half-shells 32 and 33 together in the region of their legs. At the same time, a tensile stress exerting the effects described with reference to FIG. 1 is generated in the region of the back or web part 41 of the rear half-shell 33. Although a corresponding tensile prestress, which per se is undesirable where conventional loads from the front are concerned, arises on the front half-shell 32, nevertheless there is no danger of buckling here, and appropriately the front half-shell 32 is made even more stable than the rear half-shell 33 which essentially performs only a stiffening function.

Figure 1B:
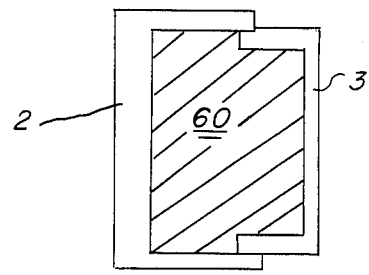
FIG. 1B shows a section taken along the line IA—IA in FIG. 1 after bonding of the half-shells and insertion of foam.

In accordance with the invention, foam 60, as shown in FIG. 1B may be introduced as a stiffener within the cavity produced by the bonding of the legs of the front and rear half-shells 2, 3, 32 and 33 of FIGS. 1 and 2.

As shown by FIG. 3 in conjunction with FIGS. 1 and 2, the bumpers 1 and 31 are provided with a fitted box-shaped insert 50 in the region of their connection to the longitudinal frame members 4, 5 and 34, 35. As seen in the plan view according to FIGS. 1 and 2, this insert is preferably mushroom-shaped in its cross-sectional contour, to avoid sharp edge contact between it and the bumper 1 and 31. Instead of mushroom-shaped contours, there can also be appropriately rounded cross-sections for the, the example, box-shaped insert 50.

The insert 50, in the region of its wall part 51, 52 directed towards the longitudinal frame members 4, 5 and 34, 35, preferably at the same time forms a receptacle for the fastening screws 53, by means of which the bumper is attached to the longitudinal frame members. It is appropriately attached in such a way that there is not direct anchoring of the screws 53 in the rear half-shell 3 or 33, but only bracing 54 between the insert 50 and the particular end of the longitudinal member 4, 5 and 34, 35, and this too can be made rounded or mushroom-shaped in cross-section, as seen in a plan view, to prevent hard edge loads. Particularly, in such thin-walled bumpers 1, 31, as indicated according to the invention, such bracing 50, 51, 52, 54 is expedient and advantageous.

In the diagrammatic representation according to FIG. 3, the box-shaped insert 50 provides additional bracing is matched in terms of its cross-section to the rear half-shell 33, the legs 45, 46 of which are surrounded by the legs 47, 48 of the front half-shell 32 at 47' and 48'. As a result, the half-shells 32 and 33 can be joined together by means of their legs overlapping one another as seen in FIG. 1B, and at the same time a certain play can be provided between the insert 50 and the front half-shell 32. Consequently, certain deformations of the bumper 31 are possible, without the front half-shell 32 at the same time being supported directly on the insert 50 from the outset. Stress peaks can thereby be avoided. It is expedient to use a box-shaped insert 50, particularly in conjunction with the design of the bumper 31 as a thin-walled girder, in order to prevent the girder from being crushed or dented in the critical region of support relative to the longitudinal frame members 34 and 35, since in strength terms it collapses as a whole when crushed in this region.

FIG. 3 also shows that the back or web part 40 of the front half-shell 32 can be provided, in the longitudinal direction, with continuous ribs 40', shown as a serrated shaped structure in cross section, to obtain guidance in the transverse direction of the vehicle during contact. It is possible in this way to achieve a deliberate stiffening of the front half-shell 32 by using the same basic material for the front and rear half-shells 32 and 33.

Appropriately, it is within the scope of the invention to provide, at the ends of 32 and 33, closing caps 55, FIG. 2, which span the open cross-section and which ensure special stiffening in this region.

While I have shown and described plural embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A bending bar for use as a bumper of a vehicle, a middle part located between two side parts, the side parts projecting on opposite sides of the middle part, the bending bar being mounted to two supports, the middle and side parts comprising:
    a front half-shell comprising a middle web part and two leg parts, and
    a rear half-shell comprising a middle web part and two leg parts,
    one of said half-shells being connected, extensively along its length, to the other half shell by deformation of at least a portion of said one half-shell to generate a tensile prestress to prevent buckling of the legs and the webs of the half-shells.

2. A bending bar according to claim 1, wherein the front half-shell and rear half-shell each respectively comprise plural legs connected by a web and the front and rear half-shells are connected to one another by butt-jointing their legs.

3. A bending bar according to claim 1, wherein the front half-shell and rear half-shell each respectively comprise plural legs connected by a web and the half-shells are connected to one another by overlapping their legs.

4. A bending bar according to claim 3, said front and rear half-shells each having two legs connected by a web, and wherein the half-shells are connected by overlapping their legs.

5. A bending bar according to claim 1, wherein the half-shells are welded to one another.

6. A bending bar according to claim 1, wherein in the initial position before connection, at least one of the half-shells has, at least over a portion of its length, a contour which extends away from the second of said half-shells in comparison with its contour after connection.

7. A bending bar according to claim 6, wherein in the initial position before connection, first and second half-shells have, at least in the region of a side part, a contour which extends away from the other half-shell in comparison with their contour after connection.

8. A bending bar according to claim 1, wherein, in the region of at least one of its side parts, the length of the legs is reduced to produce tapering.

9. A bending bar according to claim 1, wherein the open ends of the bending bar are closed by means of closing caps spanning the half-shells.

10. A bending bar according to claim 1, wherein the front half-shell and rear half-shell each respectively comprise plural legs connected by a web and a cavity between said front half-shell and rear half-shell is filled with foam.

11. A bending bar according to claim 2, wherein the bending bar is provided with a stiffening insert in a cavity between the first half-shell and the second half-shell in the region adjacent the supports.

12. A bending bar according to claim 11, characterized in that the insert is box-shaped in cross section.

13. A bending bar according to claim 11, wherein at least a supporting surface of the insert facing the web part of a half-shell is rounded in cross-section.

14. A bending bar according to claim 11, wherein at least a supporting surface of the insert facing the web part of a half-shell is mushroom-shaped in horizontal cross section.

15. A bending bar according to claim 1, wherein the front half-shell has a greater moment of resistance to loads exerted transversely thereof than the rear half-shell.

16. A bending bar according to claim 1, wherein a gap between a web portion of one half-shell edge and a web portion of the other half-shell edge is wider at the side parts than the middle part prior to being fixedly connected together.

17. A bending bar according to claim 15, each shell having mating edge portions with one half-shell edge mating portion being longer than the mating edge portion of the other half-shell; the two mating edge portions being fixedly connected together by bending the half-shells together and fastening along the mating edges whereby tension forces are exerted on said half-shells as the mating edge sections are fixedly connected to one another.

18. A bending bar according to claim 1, wherein said tensile prestress is largest in end regions of the side parts of said half-shells.

19. A prestressed bumper for a vehicle comprising
    a first half-shell means having two ends each disposed a distance from and on opposite sides of a longitudinal axis of said vehicle, a second half-shell means having two ends each disposed a distance from and on opposite sides of said longitudinal axis and having a contour on a side thereof facing the first half-shell defining a gap between and end of said first half-shell means and an end of said second half-shell means contiguous thereto when said first and second half shell means are in contact at a location contiguous to said longitudinal axis, and means to bond the first and second half-shell means extensively along their length in contiguity by reducing said gap be deformation of at least a portion of one half-shell, for producing prestress between said first and second half-shell means to restrict buckling of said half-shells.

20. A bumper according to claim 19, wherein a first of said half-shells partially overlaps said second of said half-shells at the location of said bond.

21. A bumper according to claim 19, wherein said first half-shell means has a contour which curves away from the second half-shell means to define said gap.

22. A bumper according to claim 19, wherein each of said half-shell means has plural legs joined by a web, and said legs, towards the ends thereof, decrease in length measured parallel to said longitudinal axis and each of the legs of the first half-shell means are bonded to a corresponding leg of the second half-shell means.

23. A bumper according to claim 19, further comprising a cap means mounted at each end of said first half-shell means and said second half-shell means for stiffening the bumper at the ends of the respective half-shells.

24. A bumper according to claim 19, wherein the bonding of the legs of said first half-shell means and said second half-shell means produces a cavity therebetween and further comprising foam means located in said cavity for stiffening the bumper.

25. A bumper according to claim 19, wherein each of said half-shell means has plural legs joined by a web, the legs bonded to form a cavity therebetween and said first and second half-shells are mounted to supports on said vehicle, and further comprising stiffening insert means in said cavity adjacent the location of the said supports.

26. A bumper according to claim 25, wherein the stiffener insert means contacts said webs of said first and second half-shells and presents to said webs a profile which is convex.

27. A bending bar according to claim 19, wherein the front half-shell has a greater moment of resistance to loads exerted transversely therefore than the rear half-shell.

* * * * *